(12) United States Patent
Kibler et al.

(10) Patent No.: US 10,875,587 B2
(45) Date of Patent: *Dec. 29, 2020

(54) AIR FAIRING FOR FRAMELESS TRAILER

(71) Applicant: MAC TRAILER MANUFACTURING, INC., Alliance, OH (US)

(72) Inventors: Scott A. Kibler, Kensington, OH (US); Eric R. Sabo, North Lima, OH (US)

(73) Assignee: Mac Trailer Manufacturing, Inc., Alliance, OH (US)

( * ) Notice: Subject to any disclaimer, the term of this patent is extended or adjusted under 35 U.S.C. 154(b) by 50 days.

This patent is subject to a terminal disclaimer.

(21) Appl. No.: 16/411,552

(22) Filed: May 14, 2019

(65) Prior Publication Data

US 2019/0263457 A1    Aug. 29, 2019

Related U.S. Application Data

(63) Continuation of application No. 15/637,176, filed on Jun. 29, 2017, now Pat. No. 10,414,450, which is a continuation of application No. 14/940,770, filed on Nov. 13, 2015, now Pat. No. 9,718,502, which is a continuation of application No. 14/461,878, filed on Aug. 18, 2014, now Pat. No. 9,283,998.

(60) Provisional application No. 61/870,467, filed on Aug. 27, 2013.

(51) Int. Cl.
*B62D 35/00* (2006.01)
*B62D 21/20* (2006.01)
*B62D 35/02* (2006.01)

(52) U.S. Cl.
CPC .......... *B62D 35/001* (2013.01); *B62D 21/20* (2013.01); *B62D 35/02* (2013.01); *Y02T 10/82* (2013.01); *Y02T 10/88* (2013.01)

(58) Field of Classification Search
CPC .... B62D 21/20; B62D 35/001; B62D 35/002; B62D 35/008; B62D 35/02; B62D 37/02; B62D 63/06; B62D 63/068
USPC .............................. 296/180.1, 180.4, 180.5
See application file for complete search history.

(56) References Cited

U.S. PATENT DOCUMENTS

| | | |
|---|---|---|
| 3,055,710 A | 9/1962 | Black |
| 5,454,620 A | 10/1995 | Hill et al. |
| 6,799,791 B2 | 10/2004 | Reiman et al. |
| 7,887,120 B2 | 2/2011 | Boivin et al. |
| 8,276,972 B2 | 10/2012 | Domo et al. |
| 8,322,778 B1 | 12/2012 | Pfaff |
| 8,376,450 B1 | 2/2013 | Long et al. |
| 2008/0238139 A1 | 10/2008 | Cardolle |

(Continued)

*Primary Examiner* — Jason S Daniels
(74) *Attorney, Agent, or Firm* — Sand, Sebolt & Wernow Co., LPA

(57) ABSTRACT

An air fairing device is connected below the bottom a frameless trailer to improve aerodynamic efficiency and improve fuel economy. One embodiment of the air fairing device provides an air deflector positioned forward of a trolley which supports the frameless trailer at a rear end. A second embodiment of the air fairing device provides two deflectors mounted below the frameless trailer. The first deflector is attached and extends downward from an articulating arm, said arm connecting the trailer to a semi-tractor or truck. The second deflector connected to below the bottom of the frameless trailer and positioned rear of the first deflector and forward of the trolley. A third embodiment is similar to the second but further includes a third deflector positioned between two axles of the trolley.

12 Claims, 7 Drawing Sheets

(56) References Cited

U.S. PATENT DOCUMENTS

2008/0303311 A1  12/2008  Roush
2011/0285167 A1  11/2011  Butler
2013/0127203 A1   5/2013  Johnson et al.
2018/0297645 A1  10/2018  Butler et al.

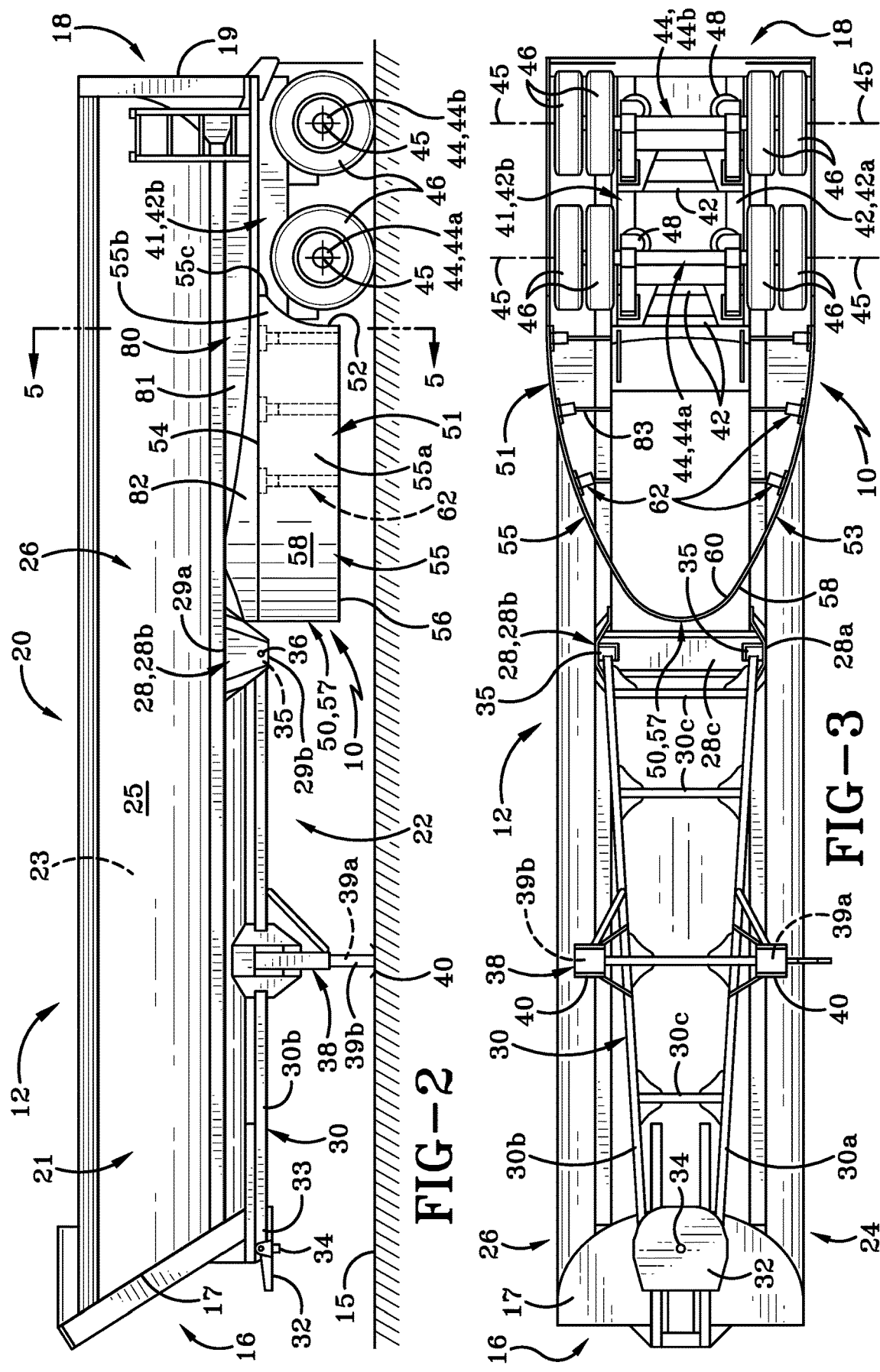

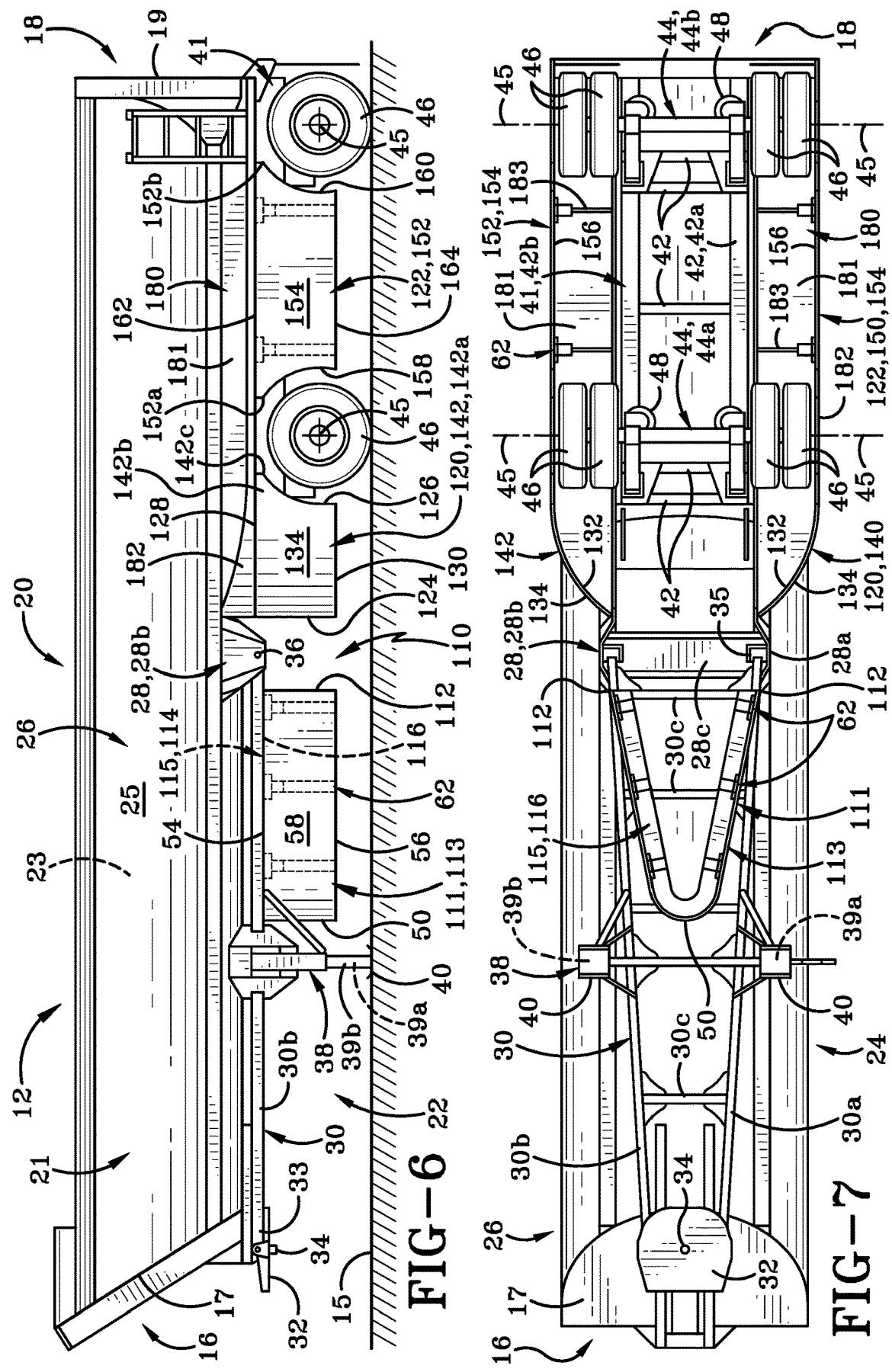

AIR FAIRING FOR FRAMELESS TRAILER

CROSS REFERENCE TO RELATED APPLICATIONS

This application is a continuation of pending prior U.S. patent application Ser. No. 15/637,176, filed on Jun. 29, 2017, which is a continuation of U.S. patent application Ser. No. 14/940,770, filed on Nov. 13, 2015, now U.S. Pat. No. 9,718,502, which is a continuation of U.S. patent application Ser. No. 14/461,878, filed on Aug. 18, 2014, now U.S. Pat. No. 9,283,998, which claims the benefit of and priority to U.S. Provisional Patent Application Ser. No. 61/870,467 filed on Aug. 27, 2013, the disclosures of each are incorporated by reference as if fully rewritten herein.

BACKGROUND OF THE INVENTION

Technical Field

The present invention relates generally to systems and devices that increase aerodynamic efficiency. More particularly, the invention relates generally to an air fairing or trailer skirt for trailers. Specifically, the invention relates to an air fairing for a frameless trailer.

Background Information

Fuel economy in combustion engine vehicles is closely related to aerodynamic efficiency of the vehicle. Aerodynamic efficiency depends on an object's ability to decrease drag forces on the object as the object passes through a flow stream, amongst other things. When drag forces are decreased, fuel efficiency tends to increase.

Road tractors, or conventionally known semi-trucks, are used to pull road trailers on roads to transport cargo. Often times, these trailers are fitted with air fairings to help improve aerodynamic efficiency by reducing drag and thus increasing fuel economy.

Frameless trailers are a type of dump trailer that lacks a frame ordinarily supporting a conventional framed or box dump trailer. The lack of any frame tends to increases fuel efficiency by decreasing weight ordinarily attributed to a frame of a tractor trailer. The lack of a frame also reduces drag by decreasing the size of the aerodynamic profile of the frameless trailer.

A need continues to exist to improve the aerodynamic efficiency of a frameless dump trailer. Further, a need continues to exist for improving the fuel efficiency of a truck having a combustion engine. The present invention addresses these and other issues.

SUMMARY

In one aspect, an embodiment of the invention may provide an aerodynamic device operatively connected to a frameless trailer, wherein when viewed from a side the frameless trailer has a top and bottom defining therebetween a vertical direction, a forward end and a rear end defining a longitudinal direction therebetween, and when viewed from the bottom left and right sides defining therebetween an axial direction, said device comprising: an air fairing sidewall extending vertically below an outer surface of the frameless trailer and positioned forward of a trailer trolley adapted to support the frameless trailer.

Another aspect of an embodiment may provide a trailer comprising: a trailer body defining an interior cargo chamber having a bottom; a first set of rear ground-engaging wheels rotatably mounted under the bottom of the trailer body; an air fairing comprising a sidewall positioned forward of the first set of wheels and extending downwardly lower than the bottom of the trailer body, and is U-shaped as viewed from below; wherein the sidewall comprises an apex segment defining a front of the sidewall, a left segment extending rearwardly and to the left from the apex segment; and a right segment which extends rearwardly and to the right from the apex segment; the apex segment has a forward facing front surface, a rearward facing rear surface, and a downwardly facing bottom terminal edge which extends substantially parallel to the ground from the front surface to the rear surface and is adjacent the front of the sidewall.

In another aspect, an embodiment of the invention may provide in combination, a truck, a frameless trailer positioned atop of a trolley, and an air fairing positioned below the frameless trailer and behind the truck, wherein the air fairing comprises at least one fairing sidewall curving outward from a leading edge and extending front to back to a rear edge.

In another aspect, an embodiment of the disclosure may provide a frameless trailer comprising: a trailer body defining an interior cargo chamber and having a front end spaced from a rear end defining a longitudinal direction therebetween and having a bottom; a set of rear ground-engaging wheels rotatably mounted under the bottom of the trailer body; an articulating arm connected to the trailer body at a pivot point and extending longitudinally below the bottom of trailer, wherein the pivot point is located between the front and rear ends and forward from the set of rear ground-engaging wheels; a forward portion of the articulating arm is adapted to releasably connect to a truck for towing the trailer and wherein the trailer body is adapted to pivot upwardly about the pivot point to dump cargo contents from the interior cargo chamber; and a first air fairing mounted to the articulating arm adapted to reduce drag as the truck tows the frameless trailer forward.

In another aspect, an embodiment may provide an aerodynamic device comprising: a frameless trailer having a longitudinal container body supported by a trolley having wheels connected to a transverse axle near a rear end of the frameless trailer, wherein the container body has a convexly curved outer surface; an articulating arm pivotably connected below the curved outer surface of the container body and a rearmost end on the articulating arm; an air fairing assembly including a first U-shaped air deflector when viewed from below, and a second air deflector; the first U-shaped air deflector entirely forward of the rearmost end on the articulating arm; and the second air deflector entirely rearward of the rearmost end on the articulating arm.

BRIEF DESCRIPTION OF THE SEVERAL VIEWS OF THE DRAWINGS

Preferred embodiments of the invention, illustrative of the best mode in which Applicant contemplates applying the principles, are set forth in the following description and are shown in the drawings and are particularly and distinctly pointed out and set forth in the appended claims.

FIG. 2 is a side elevation view of a first embodiment of the present invention depicting a frameless trailer having one air fairing device connected thereto;

FIG. 3 is a bottom view of the first embodiment of the present invention;

FIG. 6 is a side elevation view of a second embodiment of the present invention depicting a frameless trailer having a three air fairing devices extending below the bottom of the frameless trailer;

FIG. 7 is a bottom view of the second embodiment of the present invention;

Similar numbers refer to similar parts throughout the drawings.

DETAILED DESCRIPTION

Figure 1:
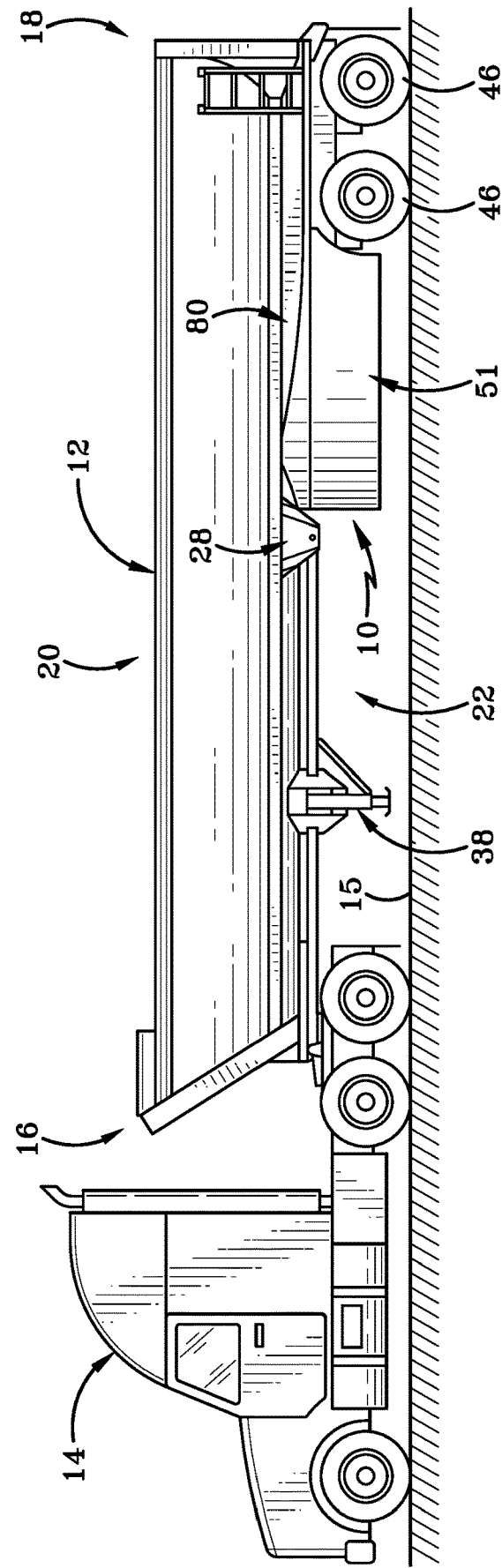
FIG. 1 is a diagrammatic view of an aerodynamic air fairing device mounted to and extending below a trailer being towed by a truck.

With primary reference to FIGS. 1-2, an aerodynamic device has an air fairing 10 connected to a frameless trailer 12 for towing behind a semi-tractor or truck 14. The frameless trailer 12 has a first or forward end 16 and a second or rear end 18 defining a longitudinal direction therebetween. Frameless trailer 12 has a top side 20 and a bottom side 22 that define a vertical direction therebetween. When viewed from the bottom, as depicted in FIG. 3, frameless trailer 12 has a first or left side 24 and a second or right side 26 that therebetween define an axial direction.

As depicted in FIG. 2, frameless trailer 12 includes a front panel 17 defining the forward end 16, a rear panel 19 defining the rear end 18, a body panel or panels 21 defining the top and bottom, 20, 22, and defining the left and right sides 24, 26, a connection member or pivot mount 28, an articulating or lift arm 30, a hitch plate 32, a hitch pin 34, a pivot pin 36, landing gear 38, and feet 40. Front panel 17 is positioned generally upright, yet other angled position, such as the sloped position depicted in FIG. 2 is possible. Rear panel 19 is generally vertical and positioned rearwardly of front panel 17. Body panel 21 extends between front panel 17 and rear panel 19. Body panel 21 may have left and right panels or be configured as a single panel having a rounded bottom defining the left and right sides, 24, 26, as depicted in FIG. 2. Body panel 21 has an inner surface 23 and an outer surface 25. Inner surface 23 at bottom 22 of trailer 12 is substantially enclosed to retain the contents within the trailer 12. The top 20 may be open or enclosed depending upon the type of material being transported. For example, raw bulk materials such as coal may be transported with a frameless trailer 12 having an open top 20 so a loader may easily load and unload the raw materials. Alternatively, liquid such as fuel would need to be transported in a container having an enclosed top.

Connection member 28 is positioned approximately longitudinally halfway between the front end 16 and rear end 18 proximate to bottom 22 of the frameless trailer 12. The connection member 28 has a top end 29a and a bottom end 29b. Preferably, the top 29a of the connection member 28 is adjacent the bottom 22 of the frameless trailer 12 and bottom 29b extends vertically below surface 25 of body 21. The bottom 29b of the connection member 28 receives articulating arm 30 connected by pivot pin 36. In the preferred embodiment, two connection members 28a, 28b engage the frameless trailer 12 on each side 24, 26 adjacent bottom 22 (FIG. 3). Connection member 28a, 28b may be connected to each other by a support member 28c (FIG. 3).

As depicted in FIG. 3, articulating arm 30 having a front end 33 and a rear end 35 is disposed vertically below the frameless trailer 12. Adjacent the front end 33 of the articulating arm 30 is the hitch plate 32 which preferably connects to a trailer seat located on the semi-trailer truck 14. The hitch plate 32 comprises a male insert or hitch pin 34 extending downward from adjacent the radial center of a terminal plate. The hitch plate 32 engages the terminal seat of a semi-trailer truck 14 via hitch pin 34 when the frameless is tractor is selectively attached, as depicted in FIG. 1. Hitch plate 32 may be secured in a conventionally known manner, such as a lock, to ensure the frameless trailer 12 is properly secured to the semi-trailer truck 14 when being hauled. In the preferred embodiment, articulating arm has a generally "A-shaped" design. Articulating arm 30 includes two articulating arm members 30a, 30b connecting at their respective forward ends. Each articulating arm member 30a, 30b extends rearwardly from the forward connection. Preferably, members 30a, 30b defines an inner hollow space to reduces the weight of the members 30a, 30b. Although this shape is preferred, other configurations such as solid arms or I-beams are contemplated. The rear end of the articulating arm members 30a, 30b defines an aperture that receives the pivot pin 36 to pivotably connect to the connection member 28. The pivotable connection of the articulating arm 30 and connection member 28 permits the pivotable rotation of the frameless trailer 12. Preferably, the first articulating arm 30a is pivotably connected to the first connection member 28a. The second articulating arm 30b is pivotably connected to the second connection member 30b. At least one support member 30c may extend axially between the articulating arm members 30a, 30b. In the preferred embodiment, a plurality first support members 30c connects to the first articulating arm 30a and the second articulating arm 30b.

With continued reference to FIG. 2 and FIG. 3, landing gear 38 extends outwardly in a downward direction from the articulating arm 30 when viewed from the side. Landing gear 38 includes a pair of legs 39a, 39b having feet 40 and may contain stand support members. The preferred embodiment of the present invention provides landing gear 38 receiving legs 39a, 39b, each having a foot 40. The first and second legs 39a, 39b are spaced apart and generally parallel elongated members. Preferably, foot 40 adapted engages the ground surface 15 when frameless trailer 12 is disconnected from the semi-trailer truck 14 in an unattached position shown in FIG. 2. When the frameless trailer 12 is connected to the semi-trailer truck 14, as seen in FIG. 1, the legs 39a, 39b and feet 40 do not engage the ground surface 15. Some embodiments may provide retractable or telescoping legs, where as other embodiments may provide pivoting legs. However, any conventionally acceptable adaptations of ensuring the legs 39a, 39b, and feet 40 are not touching the ground surface 15 when the frameless trailer 12 is connected to the semi-trailer truck 14 are contemplated.

A trailer trolley or dolly 41 is positioned adjacent the rear 18 of the frameless trailer 12. Trolley 41 attaches and supports frameless trailer 12 from below. Trolley 41 preferably comprises at least one trolley support member 42, at least one axle 44, at least two ground engaging tires or wheels 46, and a suspension system 48. The preferred embodiment provides a trolley first support member 42a and a trolley second support member 42b. The trolley first and second support members 42a, 42b are spaced apart and generally parallel oriented in the longitudinal direction. The trolley support members 42a, 42b support the weight of the frameless trailer 12. Preferably, a first axle 44a and a second axle 44b operatively engage the trolley first 42a and second support members 42b. Generally, the axles 44a, 44b extend axially and orthogonal to the trolley support members 42a, 42b. The first axle 44a is positioned forwardly of the second axle 44b. The axles 44a, 44b provide a rotational axis 45 about which the tires rotate. At least two tires 46 are operatively connected to the axle 44. The preferred embodiment provides eight wheels and tires, however other configurations are contemplated. Suspension system 48 is operatively connecting to support members 42a, 42b. A plurality of additional conventional components ordinarily associated with operatively connected a tire to an axle, such as hubs, brakes, hydraulic lines, shock absorbers (shown as part of suspension system 48), air compression lines, struts (shown as part of suspension system 48), and the like, are contemplated. Further, the trolley 41 may have a plurality of conventional components connected to the trolleys, such as mud flaps, tail lights, license plate brackets, and the like.

Figure 4:
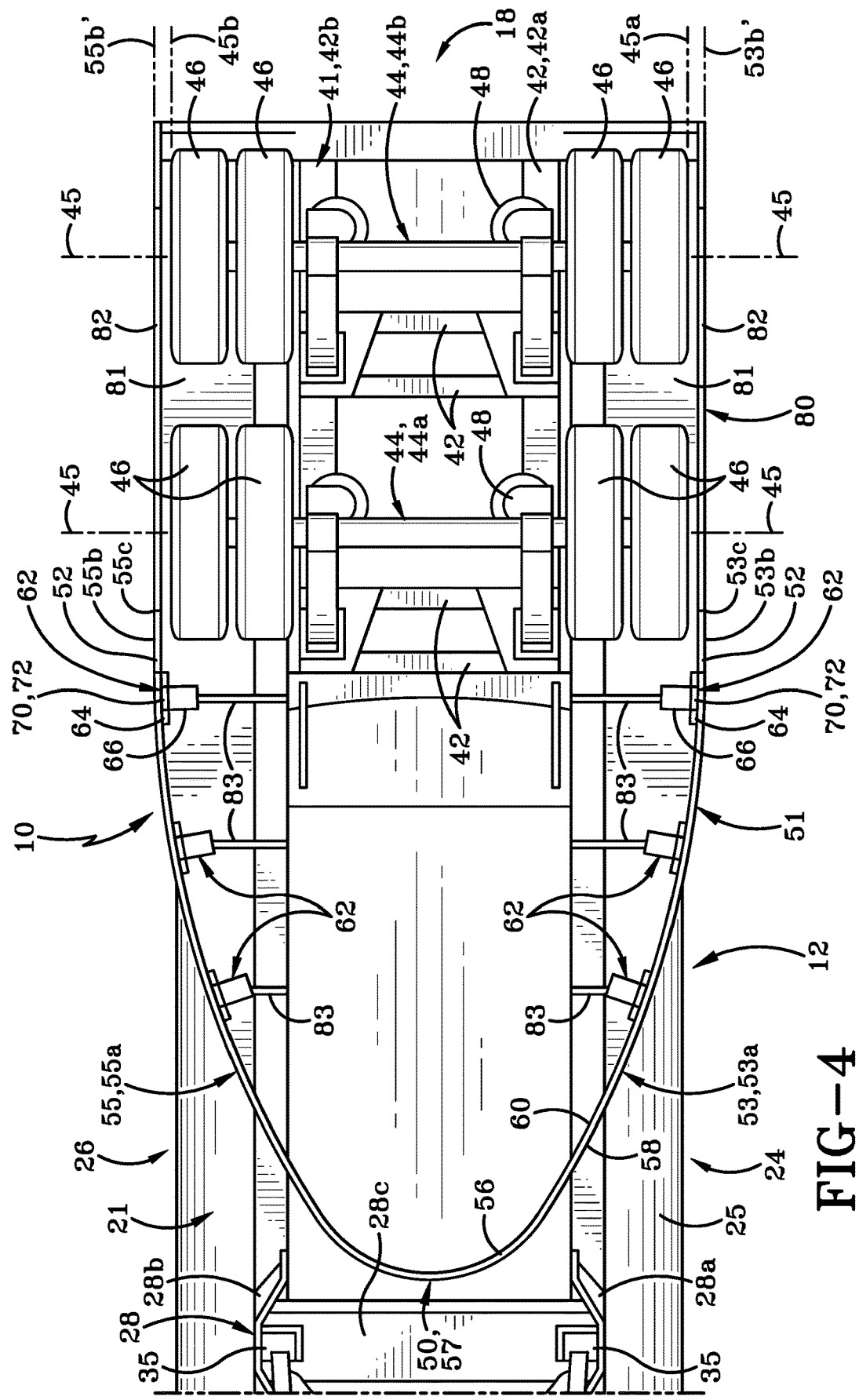
FIG. 4 is an enlarged bottom view of the first embodiment of the present invention depicting the air fairing device positioned forward of a trolley.

Wind or air fairing device 10 includes a sidewall or air deflector 51 and a mounting member 80. Deflector 51 has a leading edge 50, a rear edge 52, a top edge 54, and a bottom edge 56. Deflector 51 has an inwardly facing inner surface 60 when viewed from below and outwardly facing an outer surface 58 when viewed from below (FIG. 3). Deflector 51 includes a first or left fairing wall or segment 53 and a second or right fairing wall or segment 55 (FIGS. 3-4). Deflector 51 is attached to and supported by a plurality of mounting braces 62 positioned closely adjacent the inner surface 60 below the frameless trailer 12.

When viewing device 10 from the side (FIG. 2), leading edge 50 extends vertically below the bottom 22 of trailer 12. Edge 50 is positioned forward of rear edge 52. Rear edge 52 extends arcuately defining an arcuate or curvilinear tire recess adapted to adjacently receive tire 46. Top edge 54 extends longitudinally between leading and rear edges 50, 52. Bottom edge 56 is positioned below top edge 54 and extends longitudinally between leading and rear edges 50, 52 and is generally parallel with top edge 54. Bottom edge extends below the radially centered axis 45 of axle 44. Bottom edge 56 does not contact ground 15.

An apex segment or region 57 is axially centered below trailer 12. When viewed from the bottom as depicted in FIGS. 3-4, first fairing segment 53 extends rearwardly from apex 57 in a curve 53a axially outward towards left side 24, and extending from a substantially planar segment 53b to a terminal end 53c. Planar segment 53b is co-planar with plane 53b' positioned axially beyond an imaginary tire outer surface first plane 45a. First fairing segment 53 terminates 53c and does not extend past or rear of first axle 44a. Second fairing segment 55 extends similarly but opposite of first fairing segment 53 rearwardly from apex 57 axially outward curved 55a towards right side 26, and extending from a substantially planar 55b to a terminal end 55c. Planar segment 55b is co-planar with plane 55b' positioned axially beyond an imaginary tire outer surface second plane 45b. Second fairing segment 55 terminates 55c does not extend beyond or rearward of first axle 44a. Further, inner surface 60 of deflector 51 defines a cavity which may retain a pocket of air as trailer 12 is towed forward. Bottom edge 56 defines an entrance opening to the cavity.

Figure 5:
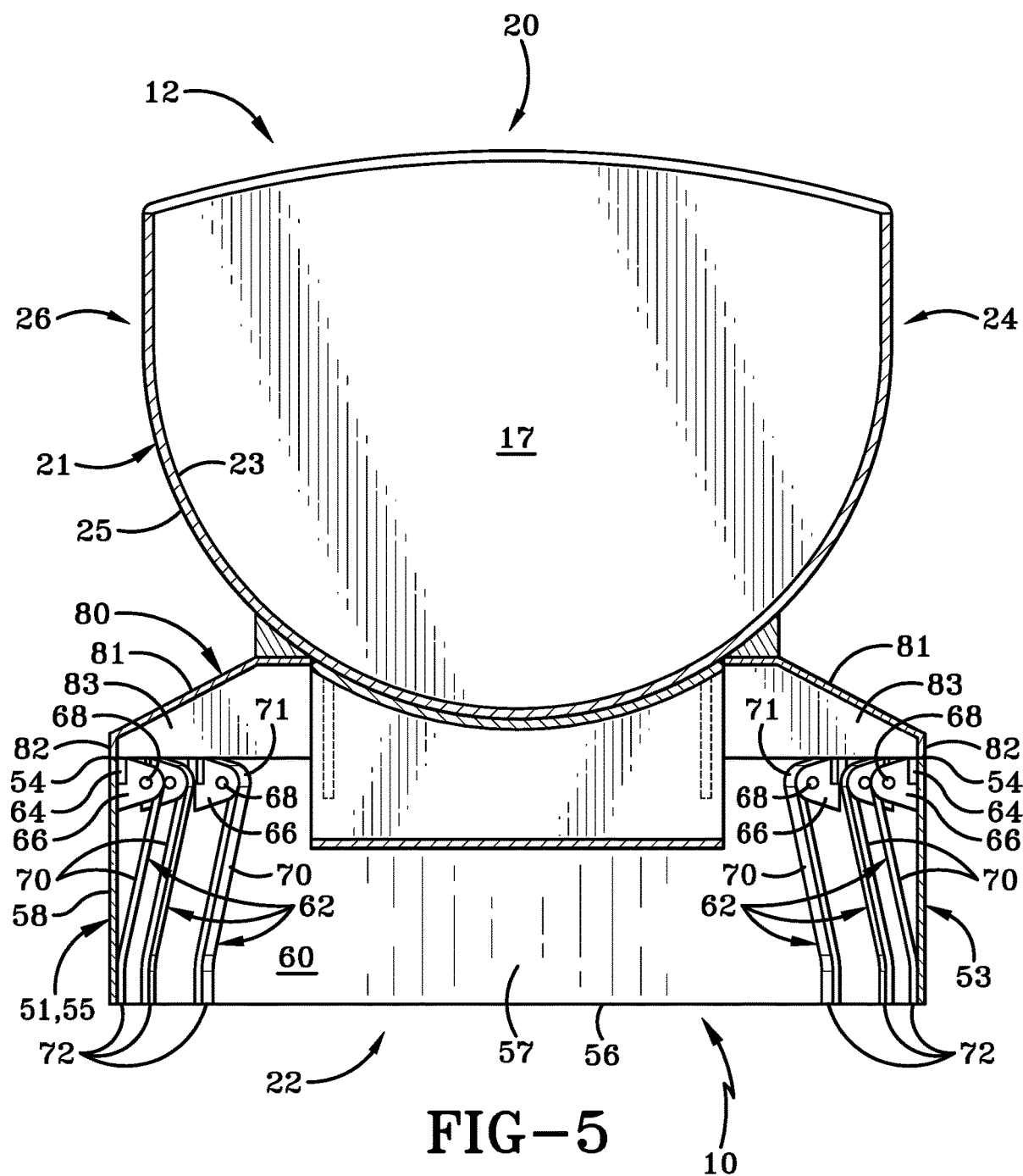
FIG. 5 is a forward facing cross section view taken along line 5-5 in FIG. 2.

When viewed from a forward facing cross section, as depicted in FIG. 5, device 10 includes mounting member 80 connecting deflector 51 to trailer 12. Member 80 includes a tapered top segment 81, a vertical end segment 82, and a plurality of axially extending support ribs 83. Member 80 connects to bottom 22 of trailer 12 extending downward along tapered segment 81 towards end 82, preferably at a tapered angle. End 82 of member 80 connects with top edge 54 of deflector 51. Support ribs 83 extend axially inward from end 82 below segment 81. Ribs 83 are connected to segment 81. Member 80 may be affixed to trailer 12 and deflector 51 in conventionally known ways as understood in the art such as welding or riveting.

Looking further to FIGS. 4-5, mounting brace 62 is positioned inwardly of inner surface 60 and includes a mounting plate 64, a lobe 66, a support pin member 68, a flex members 70, a first end 71 of flex member 70, and a terminal end 72 of flex member 70. Mounting plate 64 is connected to deflector 51 and extends inwardly beyond inner surface 60. Preferably, mounting plate 64 is connected adjacent top edge 54, however other positions where plate 64 extends inwardly beyond inner surface 60 are contemplated. Lobe 66 is closely adjacent mounting plate 64 extending inwardly beyond plate 64. Lobe 66 receives support pin 68 through an aperture formed in lobe 66.

Flex member 70 is an elongated member extending between first and terminal ends, 71, 72. First end 71 connects to lobe 66 via pin 68 extending through aligned first end 71 and aperture in lobe 66. Member 70 extends downwardly to terminal end 72 connecting deflector 51 adjacent bottom edge 56. FIG. 5 depicts a configuration having six flex members 70, however other multiples are contemplated.

Referring generally to FIGS. 6-9, a second embodiment of wind faring device is shown generally as 110. Similar to the first embodiment of device 10, device 110 has a forward deflector 111 extending downward below bottom 22 of trailer 12. Forward deflector 111 includes a vertical sidewall 113 and a top wall 115. Sidewall 113 connects to top wall 115 and extends generally vertically downward therefrom. Top wall 115 includes an upwardly facing first or top surface 114 and a downwardly facing second or bottom surface 116. Top wall 115 is axially planar extending longitudinally and connects to the bottom side of articulating arm 30 along top surface 114. Top surface 114 may attach to either one of members 30a, 30b or cross member 30c, or all three. Top wall 115 is below articulating arm and positioned forward of connection member 28 when viewed from the side. A rear vertical edge 112 terminates deflector 111 forward of connection member 28.

Second embodiment 110 further includes a separate second sidewall or deflector 120 and a third sidewall or deflector 122 when viewed from the side as depicted in FIG. 6. It is to be understood that while referring to the second and third walls 120, 122 when viewed from the side, that all components of second and third walls 120,122 are mirrored on each left and right side 24, 26 as depicted from the bottom view of FIG. 7. Deflector 120 has a leading edge 124, a rear edge 126, a top edge 128, and a bottom edge 130. Deflector 120 has an inwardly facing inner surface 132 when viewed from below and outwardly facing an outer surface 134 when viewed from below. Deflector 120 may be mounted closely adjacently below the frameless trailer container by a plurality of mounting braces 62. Leading edge 124 is vertical extending below the bottom 22 of trailer 12. Edge 124 is positioned forward of rear edge 126. Rear edge 126 extends arcuately defining an arcuate or curvilinear tire recess adapted to adjacently receive tire 46. Top edge 128 extends longitudinally between leading and rear edges 124, 126. Bottom edge 130 is positioned below top edge 128 and extends longitudinally between leading and rear edges 124, 126 and is generally parallel with top edge 128. Bottom edge 130 extends below the radially centered axis 45 of axle 44. Bottom edge 130 does not contact ground 15.

Deflector 122 has a leading edge 158, a rear edge 160, a top edge 162, and a bottom edge 164. Deflector 122 has an inwardly facing inner surface 156 when viewed from below and outwardly facing an outer surface 154 when viewed from below. Deflector 122 may be mounted closely adjacently below the frameless trailer container by a plurality of mounting braces 62 behind first axle 44a and forward of second axle 44b. Leading edge 158 extends arcuately defining an arcuate or curvilinear tire recess adapted to adjacently receive tire 46. Edge 158 is positioned forward of rear edge 160. Rear edge 160 extends arcuately defining an arcuate or curvilinear tire recess adapted to adjacently receive tire 46. Top edge 162 extends longitudinally between leading and rear edges 158, 160. Bottom edge 162 is positioned below top edge 160 and extends longitudinally between leading and rear edges 158, 160 and is generally parallel with top edge 162. Bottom edge 162 extends below the radial center 45 of axle 44. Bottom edge 164 does not contact ground 15.

Figure 8:
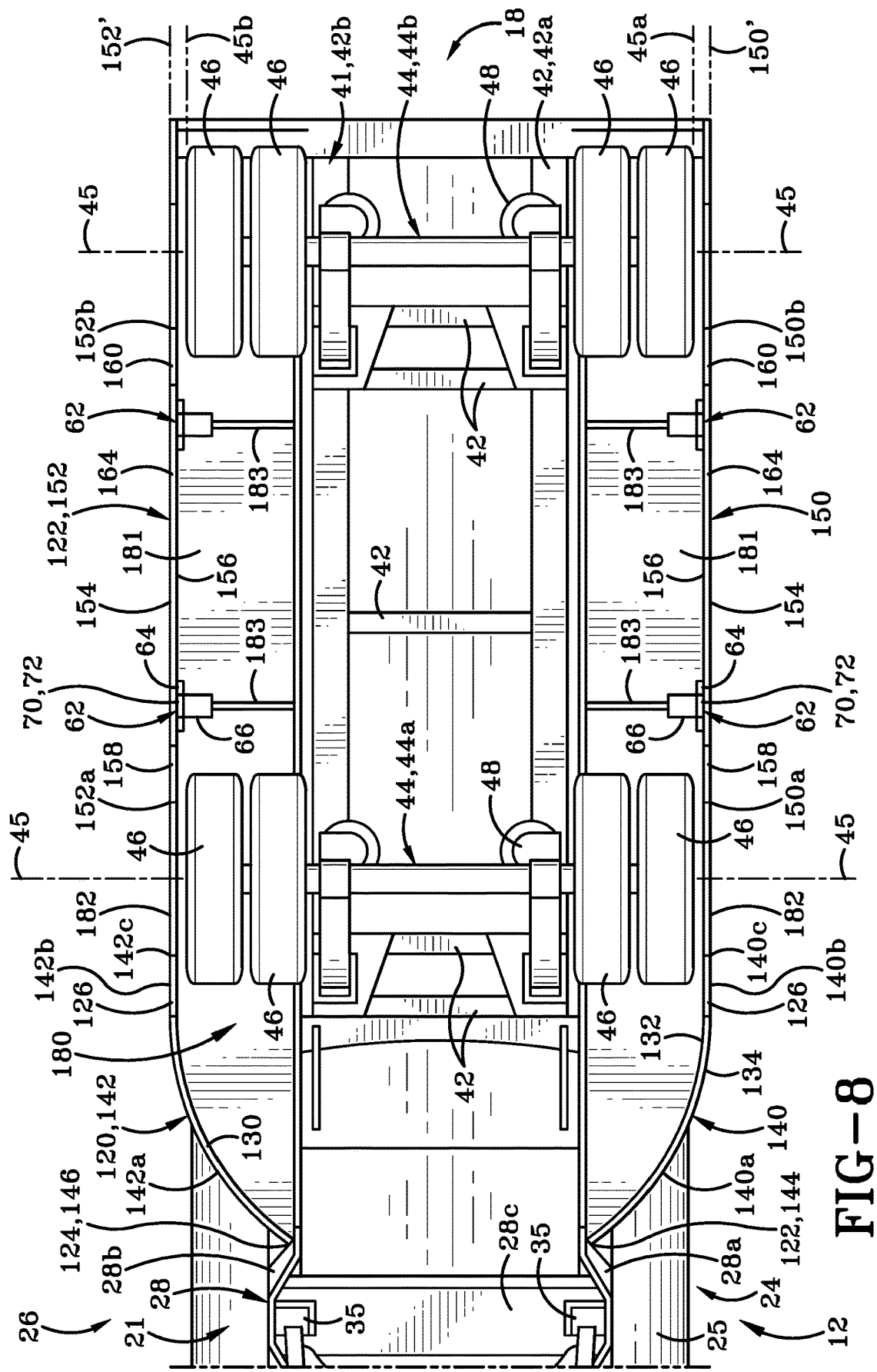
FIG. 8 is an enlarged partial bottom view of the second embodiment of the present invention depicting one air fairing device positioned forward of a trolley and another air fairing device positioned between the two axles of the trolley.
Figure 9:
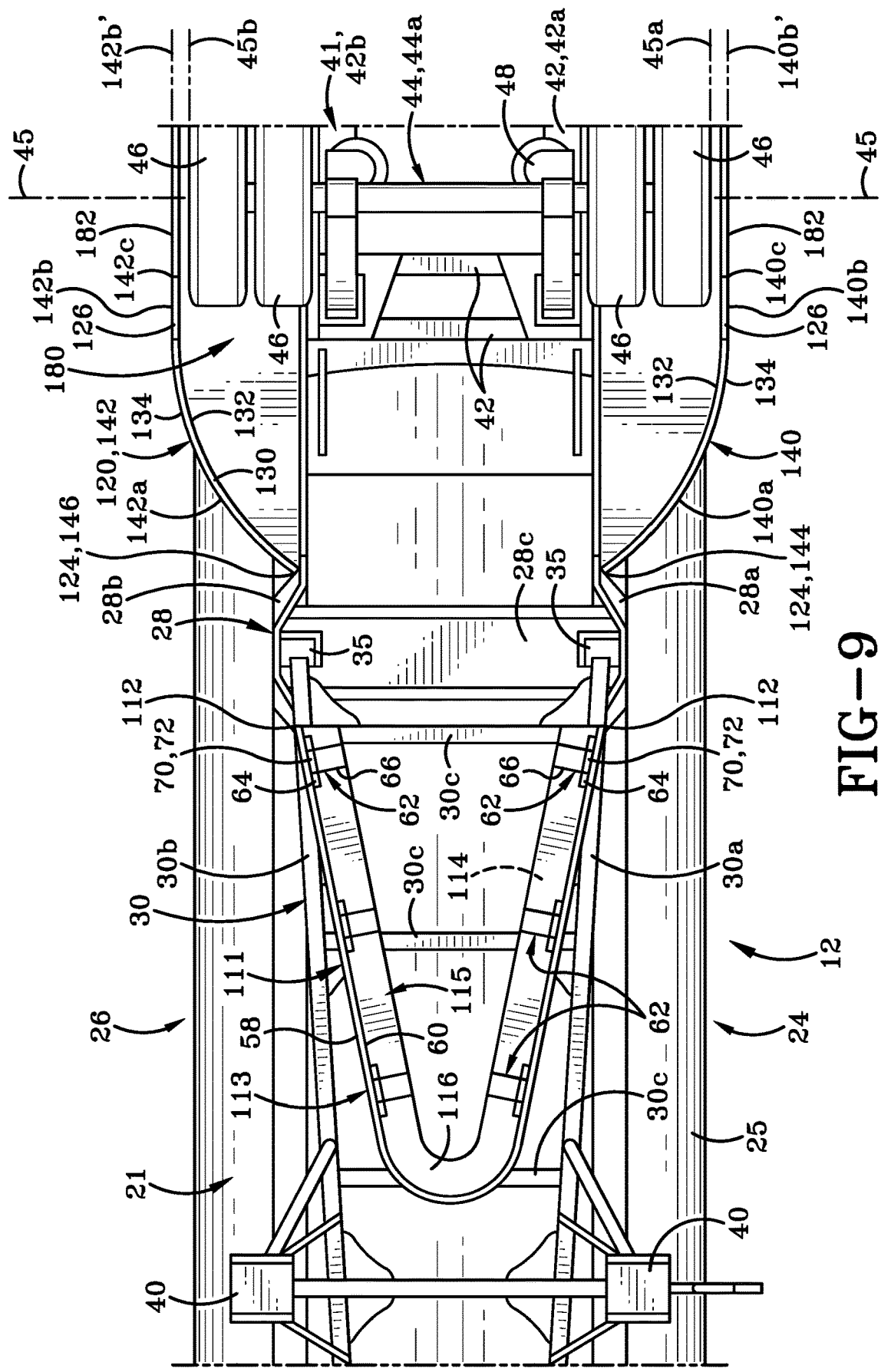
FIG. 9 is an enlarged partial bottom view of the second embodiment depicting one air faring device mounted to an articulating arm and positioned forward of the other two air fairing devices.

When viewed from the bottom as depicted in FIGS. 8-9, second deflector 120 includes a first fairing member 140 and a second fairing member 142. First fairing member 140 extends rearwardly from a connection 144 with connection member 28. Connection 144 is shown as located towards the rear end of member 28a, however other connection locations below the bottom 22 of trailer 12 are contemplated. Member 140 extends from connection 144 in a curve 140a axially outward towards a planar segment 140b adjacent left side 24. Segment 140b is coplanar with plane 150'. Plane 150' is positioned axially outward or beyond first tire plane 45a. First fairing member 140 terminates 140c and does not extend past or rear of first axle 44a.

Second fairing member 142 extends similarly but opposite of first fairing member 140 rearwardly from connection 146 connected to member 28b. Connection 144 is shown as located towards the rear end of member 28b, however other connection locations below the bottom 22 of trailer 12 are contemplated. Member 142 extends from connection 144 axially outwardly curved 142a towards a planar segment 142b adjacent right side 26. Segment 142b is coplanar with plane 152'. Plane 152' is positioned axially outward or beyond second tire plane 45b. Second fairing member 142 terminates 142c and does not extend beyond or rearward of first axle 44a. Support ribs 183 may be connected to deflector 120 and extend axially inward from an inner surface of sidewall 22.

Third deflector 122 includes a first fairing member 150 and a second fairing member 152. Third deflector first fairing member 150 is positioned adjacent left side 24, co-planar with plane 150', outside imaginary tire outer surface first plane 45a extending longitudinally from first to second end, 150a, 150b, respectively. First member 150 is positioned rear of first axle 44a and forward of axle 44b. Second fairing member 152 is positioned adjacent right side 26, co-planar with 152', outside imaginary tire outer surface second plane 45b extending longitudinally from first to second end, 152a, 152b, respectively. Second deflector member 152 is positioned rear of first axle 44a and forward of axle 44b. Support ribs 183 may be connected to sidewall 124 and extend axially inward from an inner surface of deflector 122.

As shown in FIG. 7, the outer surfaces 58, 134, 154 of the respective deflectors 111, 120, 122 extend in smooth manner along extends along the same imaginary smooth pathway. The smooth pathway is effective in reducing drag as air flows around deflectors 111, 120, 122. Although the imaginary pathway is not physically continuous or connected, the imaginary plane connecting two deflectors, for example the gap extending between deflector 111 and deflector 120, would create a smooth line when viewed from below.

Second embodiment of wind faring device 110 further includes a mounting member 180 connecting deflectors 120, 122 to trailer 12. Member 180 includes a tapered top segment 181, a vertical end segment 182, and a plurality of axially extending support ribs. Member 180 connects to bottom 22 of trailer 12 extending downward along tapered segment 181 towards an end 182, preferably at a tapered angle. End 182 of member 180 connects with top edge 128 of deflector 120 and top edge 162 of deflector 122. Support ribs may extend axially inward from end 182 below segment 181. Ribs may be connected to segment 181. Member 180 may be affixed to trailer 12 and deflector 51 in conventionally known ways as understood in the art such as welding or riveting.

In operation, the embodiments of the present invention work to increase fuel efficiency, decrease the effect of drag forces, and provide more control for a driver as truck 14 tows frameless trailer 12 having device 10 or 110. Trailer 12 having device 10 or 110 preferably begins in a grounded position with the landing gear 38 engaging ground 15 (FIG. 2 and FIG. 6). Trailer 12 is then loaded with material that needs to be transported, such as dirt, gravel, or other bulk materials. Truck 14 is positioned to engage and connect with plate 32 and hitch 34. Once engaged, landing gear is raised to an ungrounded position (FIG. 1). Truck 14 tows trailer 12 in a direction causing device 10, which is attached to trailer 12, to advance forward through an airstream opposition the airstream flow path. The reduction of drag increases fuel efficiency for the semi-trailer truck 14 as it moves forward through an airstream along a direction opposite to a direction of air travel. The curvature of the sidewalls of device 10 or 110 permits an efficient aerodynamic profile as device 10 or 110 advances against the path of air travel. Flex member 70 operates to support side wall 21. Member 70 acts as a spring mechanism to provide a force source pushing outwardly from the inner surface 60 against sidewall 21 to counteract forces generated by wind as truck 14 moves forward with the trailer 12 in tow.

Throughout this specification the term "frameless trailer" is used and refers to a dump trailer that lacks a frame ordinarily supporting a dump trailer. The frameless trailer 12 is supported by the body panels that comprise the trailer 12. The lack of any frame increases fuel efficiency by decreasing weight ordinarily attributed to a frame of a tractor trailer. The lack of a frame also reduces drag by decreasing the size of the aerodynamic profile of the frameless trailer. One exemplary frameless dump trailer is commercially known as the AR 450 SCRAPMAC manufactured and sold by MAC Trailer of 14599 Commerce Street in the Town of Alliance, State of Ohio.

Alternative configurations of the frameless trailer are contemplated within these described embodiments. Preferably, a body panel extends between front and rear ends, however a bottom panel may connect adjacent to the bottom of a left and right panel. However, alternate configurations as would ordinarily be understood in the art such as side panels being rounded and connected to each other to form a rounded bottom edge, or an inverted cone shape, are contemplated.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the invention are an example and the invention is not limited to the exact details shown or described.

What is claimed:

1. A frameless trailer comprising:
   a frameless body having a front end spaced from a rear end defining a longitudinal direction therebetween;
   at least one set of ground-engaging wheels mounted under the frameless body, wherein the at least one set of ground-engaging wheels are connected to an axle and are operative to support the frameless body;
   an articulating arm connected to the frameless body, wherein a forward portion of the articulating arm is adapted to releasably connect to a truck for towing the frameless trailer and wherein the frameless body is adapted to carry bulk materials therein; and
   an air fairing carried by the articulating arm wherein a portion of the air fairing is forward of a rear end of the articulating arm; said air fairing having a first air deflector extending vertically below the outer surface of the frameless trailer and positioned forward of the trailer trolley and a second air deflector extending vertically below the outer surface of the frameless trailer and mounted rearwardly from the first air deflector, wherein the second deflector includes: a left fairing member extending rearwardly from a first connection member curving outward towards the left side and terminating forward of the axle; and a right fairing member extending rearwardly from a second connection member curving outward towards the right side and terminating forward of the axle.

2. The frameless trailer of claim 1, further comprising:
   landing gear connected to the articulating arm longitudinally between the forward portion and a pivot point;
   wherein a portion of the first air fairing is longitudinally between the landing gear and the pivot point.

3. The frameless trailer of claim 1, further comprising:
   a third air deflector extending vertically below the outer surface of the frameless trailer and mounted rearwardly of the first and second deflectors.

4. The frameless trailer of claim 3, wherein the first air deflector is positioned forwardly of the longitudinal center of the trailer; and the second and third air deflectors are positioned rearwardly of the longitudinal center of the trailer.

5. A frameless trailer comprising:
   a frameless body having a front end spaced from a rear end defining a longitudinal direction therebetween;
   a set of ground-engaging wheels mounted under the frameless body;
   an articulating arm connected to the frameless body at a connection member, wherein a forward portion of the articulating arm is adapted to releasably connect to a truck for towing the frameless trailer and wherein the frameless body is adapted to carry bulk materials therein;
   a first air fairing carried by the articulating arm, wherein a portion of the first air fairing is forward of the connection member; and
   a mounting member coupling the first air fairing to the articulating arm, wherein the mounting member is flexible and enables the first air fairing to flex when subjected to air forces as the frameless trailer is towed forwardly.

6. The frameless trailer of claim 5, further comprising:
   a foremost apex region curved relative to the longitudinal direction of the frameless body located on the first air fairing.

7. The frameless trailer of claim 6, wherein the foremost apex region is positioned forwardly from the rear end of the articulating arm.

8. The frameless trailer of claim 5, further comprising:
   a top wall of the first air fairing located below the articulating arm.

9. The frameless trailer of claim 8, wherein the top wall is positioned forward of the rear end of the articulating arm.

10. The frameless trailer of claim 5, wherein the articulating arm is positioned below and pivotably connected to the frameless body.

11. The frameless trailer of claim 5, wherein the frameless body is operative to pivot upwardly about a pivot point to dump the bulk materials therein from an interior of a cargo chamber within the frameless body.

12. The frameless trailer of claim 11, further comprising:
    landing gear connected to the articulating arm longitudinally between the forward portion and the pivot point;
    wherein a portion of the air fairing is longitudinally between the landing gear and the pivot point.

* * * * *